July 7, 1925.
W. J. CAMERON
CAUTERY AND HOLDER
Filed April 11, 1923　　2 Sheets-Sheet 2
1,544,554
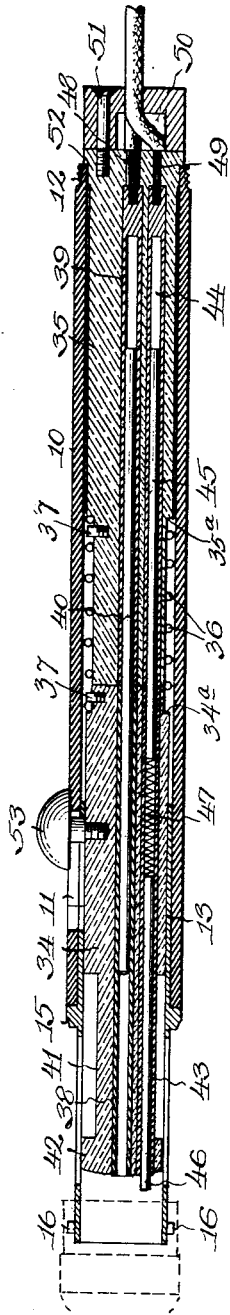
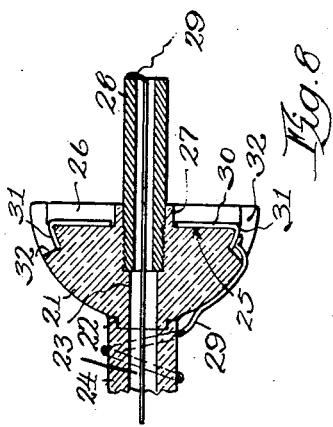
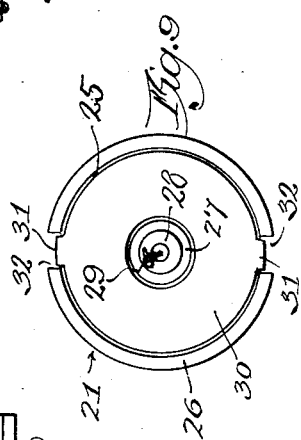
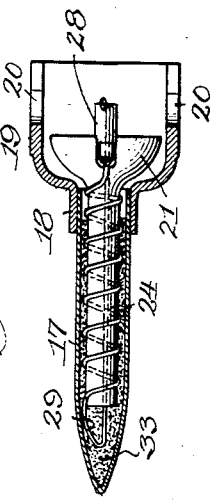
Inventor,
Will J. Cameron Patented July 7, 1925.

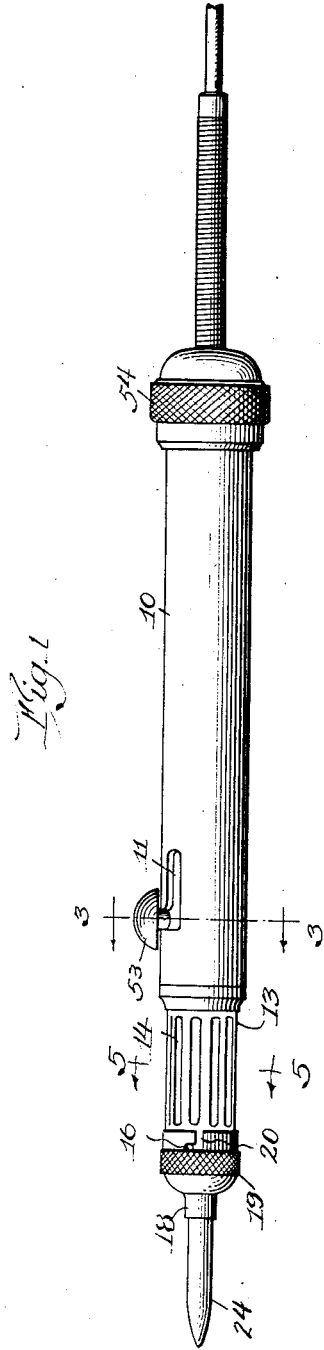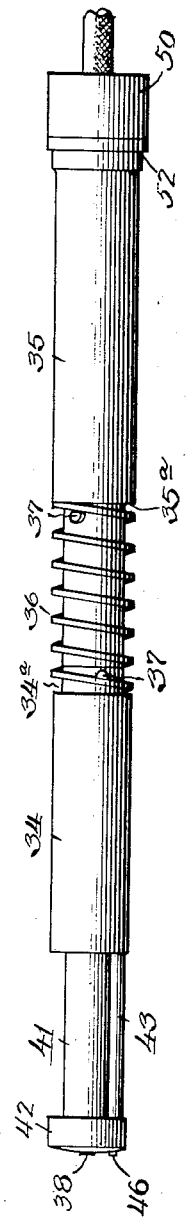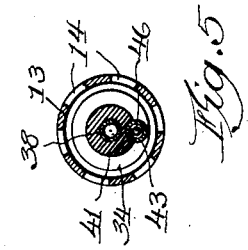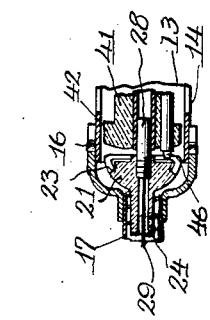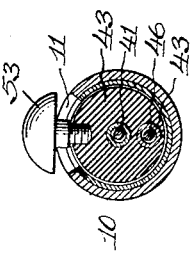

1,544,554

UNITED STATES PATENT OFFICE.

WILL J. CAMERON, OF CHICAGO, ILLINOIS.

CAUTERY AND HOLDER.

Application filed April 11, 1923. Serial No. 631,260.

*To all whom it may concern:*

Be it known that I, WILL J. CAMERON, a subject of the King of Great Britain, residing at Chicago, in the county of Cook and State of Illinois, have invented certain new and useful Improvements in a Cautery and Holder, of which the following is a specification.

My invention relates to surgical instruments, and more particularly to a device for cauterizing, and to a holder in which the cautery tip is mounted, and by means of which the current for generating the heat within the unit is controlled.

Among the divers objects of my invention are the provision of a cautery tip that is constructed as a unitary device that may be readily attached to or detached from the end of the holder, and which is so constructed that when the switch carried by the holder or handle is moved into position to conduct the current to the tip the proper contact will be made with the terminals of the tip irrespective of the relative positions of the tip and holder. It is a further object of my invention to provide a handle device for a cauterizing instrument that is simple in construction and so arranged that the electrical elements contained therein may be quickly and easily removed from its interior as a unit so that the handle or holder may be sterilized without injury to the electrical elements. A further object resides in the provisions of a novel manner of constructing the switch elements so that the operator may quickly turn on or off the current at any desired time, and which will insure a positive contact with the terminals of the tip when the switch is moved to close the current regardless of the relative positions of the switch and tip elements. This construction provides for a wiping contact between the parts when the switch is turned on, thereby attaining a better or more dependable electrical connection between the parts. A further object resides in providing a novel heating unit within the tip that is adapted to heat to the desired temperature quickly, and which is constructed in a novel manner so that it is not liable to become injured through accident. I prefer to carry out my invention in substantially the following manner, the drawings illustrating a preferred or typical embodiment of my invention.

In the drawings:

Fig. 1 is a longitudinal side elevation of my improved cautery tip and handle or holder, drawn approximately to the full scale.

Fig. 2 is a longitudinal side elevation of the unit forming the core of the handle or holder in which the switch and conductors are embodied, and drawn to a slightly enlarged scale.

Fig. 3 is a transverse section through the switch operating button on line 3—3, Fig. 1.

Fig. 4 is a fragmentary view showing the manner of making contact between the terminals of the tip and the handle.

Fig. 5 is a transverse section on line 5—5, Fig. 1, and enlarged.

Fig. 6 is a longitudinal central section of the structure shown in Fig. 1, with the tip in dotted lines, and drawn to a slightly enlarged scale.

Fig. 7 is an exaggerated view in longitudinal section of the cautery tip.

Fig. 8 is a longitudinal section of the rear portion of the heating unit within the tip.

Fig. 9 is a rear view of the structure illustrated in Fig. 8.

By referring to the drawings, it will be seen the holder comprises a cylindrical casing or shell 10 that is elongated, and adjacent one end is provided with a bayonet slot 11 through which the switch controlling element projects, and at its opposite end is preferably screw-threaded, as at 12, (Fig. 6). Fitted into the end of casing 10 opposite the threaded end 12 is a sleeve 13, preferably of metal, the rear portion of which extends into the casing past bayonet slot 11, where it is similarly slotted to accommodate the switch operating element. The outer exposed portion of the sleeve extends beyond the adjacent end of casing 10 and is provided with a plurality of longitudinal slots 14, whereby an open cage-like structure is provided through which air may circulate, and just back of these slots the sleeve is provided with an annular rib or shoulder 15 that abuts the adjacent end of casing 10. At its outer end the sleeve is provided with transverse or lateral pins 16 projecting diametrically opposite each other to receive and retain the adjacent end of the cautery tip. The tip, as seen in Figs. 1, 7 and 8, preferably comprises an outer casing 17 having a conical pointed outer end that is closed, and its opposite end is fitted into a reduced neck 18 upon the adjacent end of a ferrule 19, the latter having therein oppositely arranged bayonet slots 20 that extend to the edge of the ferrule for engagement with transverse pins 16 upon the outer end of sleeve 13.

The parts of the tip just mentioned are preferably of metal, or the like, and are adapted to house the heating unit of the cautery, which unit preferably comprises a hemi-spherical base 21 upon the crown of which is provided a small projection 22 and is bored, as at 23, centrally through the base and projection. A tube of insulating material 24 is mounted upon projection 22 and extends into the interior of casing 17 while opposite this projection 22 the base is flattened and provided with an annular depression 25 that provides a peripheral rim 26, and centrally of the depression is an extension 27 opposite to and alining with projection 22. A tube 28 of insulating material is inserted in the bore of the base centrally of projection 27 and extends rearwardly therefrom a short distance. The bores of base 21, and tubes 24 and 28 aline with each other, and a suitable conductor of resistance wire 29 is secured at one end to the outer portion of tube 28 and is inserted through its bore as well as through the bore of base 21 and tube 24. Outside tube 24 and within the conical end of casing 17 wire 29 is looped back and wound spirally upon the exterior of tube 24 so that the two lengths of the wire are insulated from each other to prevent fusing and short circuiting. Seated in the annular depression 25 is a washer-like disk 30 of metal of suitable conductivity, that is provided with tangs 31 projecting radially from diametrically opposite sides, and in order to retain disk 30 in position and afford no obstruction upon the exterior of base 21, the latter is provided with oppositely arranged channels 32 that extend through peripheral flange 26 and into the body of base 21, as seen in Fig. 8 of the drawings. The tangs 31 of disk 30 are bent laterally into channels 32 and thus maintain disk 30 in position, and the adjacent exterior end of conductor wire 29 after completing the coil around tube 24 is soldered or otherwise electrically connected to one of these tangs. The unit just described is inserted bodily into casing 17 and ferrule 19 of the tip and is surrounded with an electrically inert packing material 33 in the manner shown in Fig. 7 of the drawings so as to maintain the parts in desired assembly, and completely insulated electrically from adjacent parts.

The switch mechanism or means for controlling the current flowing into the tip comprises two cylindrical plugs of insulating material 34 and 35, which, in normal position, abut each other, as seen in Figs. 2 and 6, and the portions adjacent the abutting ends are reduced in diameter to provide shoulders 34ª and 35ª, respectively, to receive and seat a coiled contraction spring 36. The ends of this spring are maintained upon the reduced portions and against the respective shoulders by means of transverse pins 37 projecting from the reduced portions of plugs 34 and 35 and prevent accidental separation of the spring from the respective plugs. The plugs 34 and 35 are axially bored throughout their lengths, and have metal conductor tubes 38 and 39 inserted in their respective bores and extend from end to end thereof, and a conductor rod 40 is inserted in said tubes so as to keep the plugs in alinement with each other and permit their movement longitudinally away from each other in the manner to be hereinafter described, rod 40 acting as a guide to prevent lateral movement of the respective plugs, as well as to conduct the current when the plugs are separated. Plug 34 is reduced in diameter adjacent its forward end to provide a neck 41 that spaces the reduced portion away from the slotted cage-like extension tube 13 and permits the free circulation of air to prevent conductivity of the heat to the handle, and at the end of the neck is a head 42 that fits within the longitudinally slotted portion of sleeve 13. The plugs 34 and 35 are also eccentrically bored, and conductor tubes 43 and 44, respectively, are inserted in these bores in alinement with each other, and a conductor guide rod 45 is mounted in one of the tubes and extends into the other to assist in guiding the longitudinal movements of the blocks with respect to each other, and prevent their independent rotation. This rod 45 is shorter than rod 40 in the axial tubes, as seen in Fig. 6 of the drawings, and tube 43 is exposed at the neck portion 41 of block 34 alongside of which it extends. A plunger conductor in the form of a rod 46 is inserted in the outer end of tube 43 and has a spring 47 interposed between its inner end and the adjacent end of guide rod 45 so that the projecting end portion of plunger 46 is depressible and will form a yielding contact with its respective terminal plate 30 when the tip is assembled therewith.

Conductor wires 48 and 49 are connected to the inner closed ends of tubes 39 and 44 and pass through a retaining member 50 that is secured upon the outer end of plug 35 by means of a screw 51. As seen in Fig. 6, the outer end of plug 35 is increased in diameter to provide a shoulder 52 that abuts the threaded end 12 of the casing and prevents said plug moving forward in casing 10, and an interiorly threaded cap 54 fits over retaining member 50 and engages threads 12 to hold plugs 34 and 35 and associated parts within casing 10, A control button 53 has its shank inserted in bayonet slot 11 in the casing and is screwed into the adjacent portion of plug 34 so that the operator may readily manipulate said button for turning on or off the current. When the button is moved forwardly by the operator and then laterally to seat in the lateral portion of bayonet slot 11, plug 34 will have been moved thereby against the contraction of spring 36 away from plug 35 and is guided in its movement by guide rods 40 and 45. The lateral movement of the button causes a rotative movement of plugs 34 and 35 within casing 10, the purpose of which will shortly appear. The tube 28 of the heating unit of the tip is of such diameter that when the plug is in this position, said tube 28 will have been inserted telescopically into the end of tube 38 in the movable plug 34. The projecting end of plunger 46 will also have engaged the metal disk 30 on the base of the heating unit and will have retracted into its tube slightly upon the making of the contact and the rotative movement of the plugs above mentioned will cause a wiping contact between plunger 46 and annular terminal 30 and also between tube 38 and the end of wire 29 on tube 28. The disk 30 being annular and surrounding the central terminal will also insure a contact with the end of plunger 46 in any position that the structure may have been assembled so that it is unnecessary to provide accurate assembly of any of the elements, excepting the axially alinement of tube 38 of the block and tube 28 of the tip. The current flowing through conductors 48 and 49 is conducted along the respective tubes and guide rods and transmitted through the contact of the respective terminals of the small heating wire 29 in the tip which readily becomes incandescent and heats the tip to the desired temperature for cauterizing. Whenever desired, the operator may disconnect the electrical elements by disengaging the shank of button 53 from the lateral portion of bayonet slot 11, whereupon, through the retractive action of spring 36, plug 34 and the parts carried thereby are retracted or moved away from the tip, thus breaking the electrical connection therewith.

It will readily be seen that cap 54 may be unscrewed and removed from casing 10, and, after removing button 53, the casing may be slid off the plugs for the purpose of sterilizing the same or for inspection and repair of the parts contained therein.

What I claim is:—

1. A cautery tip comprising a cylindrical casing closed at one end, a tube of insulating material extending into said casing, and a resistance element extending through said tube and looped back outside the same; the ends of said element secured to extensions of said tube outside said casing at points spaced from each other.

2. A cautery tip comprising a cylindrical casing closed at one end, an enlarged socket at the opposite end of said casing, a tube of insulating material extending into said casing, and a resistance element extending through said tube and looped back at the forward end of said casing upon the exterior of said tube, the ends of said element secured to the portion of said tube within said socket at points spaced from each other.

3. A cautery tip comprising a cylindrical casing closed at one end, a tube of insulating material extending into said casing, a resistance element looped intermediate its ends within said casing; one portion of said element extending through the bore of said tube and secured to the outer end thereof, and a contact plate mounted on said tube; the opposite portion of said element disposed upon the exterior of said tube and secured to said contact plate.

4. A cautery tip comprising a cylindrical casing closed at one end, a tube of insulating material extending into said casing, a hemispherical enlargement on said tube outside said casing, an annular contact plate mounted on the base of said enlargement, and a resistance element looped intermediate its ends adjacent the closed end of said casing; one portion of said element disposed in the bore of said tube and secured to the outer end thereof and the other portion of said element disposed upon the exterior of said tube and secured to said contact plate.

5. A cautery tip comprising a casing closed at one end, a resistance element looped intermediate its ends adjacent the closed end of said casing, insulation material interposed between the length of said element extending from said loop, and an annular contact to which one end of said element is secured and which is insulated from the opposite portion of said element.

6. A cautery tip comprising a cylindrical metallic casing having a conical closed anterior end, an insulating tube disposed centrally therein, a conductor wire of resistance material having a looped intermediate portion positioned in the conical end of said casing, one portion of said wire extending through said tube and the other portion wound spirally upon the exterior of said tube, an annular contact at the outer end of said tube to which the end of the spiral portion of the wire is electrically connected, a second tube alining with the first tube at the open end of said casing and to which the opposite end of said wire is secured, and a ferrule connected to the posterior end of said casing and having means for removably mounting the structure upon a suitable holder.

7. A cautery comprising a handle of insulating material provided with a central bore, a ventilated anterior extension secured to said handle, a hollow metallic tip detachably secured to said extension, a resistance element within said tip and having terminals disposed in spaced relation at the posterior end thereof, a plug of insulating material reciprocably mounted in the anterior end of said handle and extension, conductors longitudinally disposed in said plug to register with the terminals of the resistance element, means for maintaining said plug yieldingly in retracted position, and means for projecting and holding said plug with its conductors in contact with the terminals of the resistance element.

8. A cautery comprising a tubular body, a detachable tip thereon, a resistance unit mounted in said tip having spaced terminals at the posterior thereof, and a switch device for controlling current transmitted to said resistance unit consisting of a pair of cylindrical plugs mounted within said body one of which is movable longitudinally away from the other, conductors extending through and reciprocably connecting said plugs, and means for projecting and holding the anterior plug in juxtaposition with the terminals of said tip.

9. A cautery comprising a tubular body, a detachable tip thereon, a resistance unit within said tip and having spaced terminals at its posterior end, a pair of cylindrical plugs mounted within said body, alining axial and eccentric tubular conductors extending through said plugs, conductor guide rods in the alining tubes of the respective plugs whereby one of said plugs may be moved longitudinally away from the other, and a yieldable contact plunger projecting from the anterior end of the eccentric conductor tube in the movable plug.

10. A cautery comprising a tubular body, a detachable tip thereon, a resistance unit within said tip and having a centrally protruding and an annular terminal at the posterior end thereof, a longitudinally reciprocable plug within said body, a central hollow conductor in said plug, a yieldable conductor projecting eccentrically from said plug, means for supplying current to said conductors and means for moving said plug whereby its central conductor telescopes the protruding terminal of said resistance unit and its yieldable conductor engages the annular terminal of said resistance unit.

11. A cautery comprising a tubular body, a detachable tip thereon, a resistance unit within said tip and having a centrally protruding and an annular terminal at the posterior end thereof, a pair of plugs within said body one of which is longitudinally reciprocable, telescoping conductors connecting said plugs, a yieldable plunger projecting from one of the conductors in the reciprocable plug at the end thereof adjacent said tip, yieldable means maintaining said plugs normally abutting each other, and means for moving and holding said reciprocable plug spaced from the other plug, whereby said plunger is brought into contact with the annular terminal of said resistance unit and the other conductor telescopes the protruding terminal thereof.

12. A cautery tip comprising an electrically energized element for generating heat, a hollow cauterizing element in external relation thereto and surrounding the same, and an electrically insulating element therebetween.

Signed at Chicago, county of Cook, and State of Illinois, this 28th day of March, 1923.

WILL J. CAMERON